April 26, 1938.　　　S. RUBEN　　　2,115,399

PHOTOVOLTAIC CELL

Filed Dec. 29, 1933

INVENTOR
SAMUEL RUBEN
BY
ATTORNEY

Patented Apr. 26, 1938

2,115,399

UNITED STATES PATENT OFFICE 2,115,399

PHOTOVOLTAIC CELL

Samuel Ruben, New Rochelle, N. Y.

Application December 29, 1933, Serial No. 704,481

13 Claims. (Cl. 136—89)

This invention relates to a photo-voltaic cell; specifically, to an electrolyte for use in such cells.

An object of the invention is to produce photo-voltaic cells having an improved stable electrolyte.

A further object is to produce an improved photo-voltaic cell of the type utilizing a light-sensitive element composed of copper having a thermally-integrally-formed cuprous oxide surface.

Figure 1:
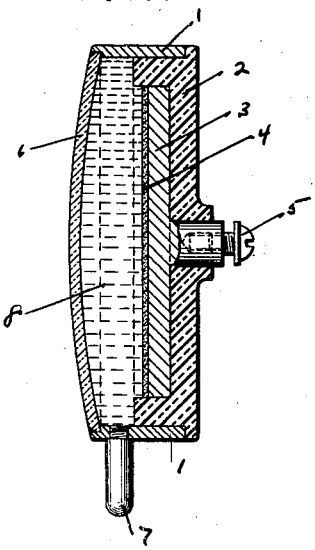
Figure 2:
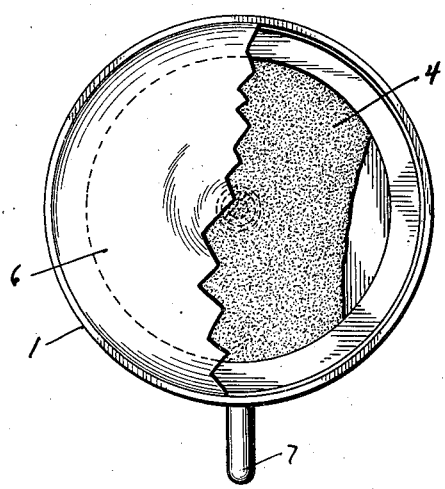

Further objects will be apparent from the disclosure and from the drawing in Fig. 1 in which is shown a photo-voltaic cell of suitable construction and Fig. 2 which shows detail of the photo-sensitive element.

This application is in part a continuation of my United States Letters Patents Numbers 1,941,493 and 1,941,494 of January 2, 1934, subsequently re-issued as Re-issue Patent 19,218, dated June 19, 1934. In the course of the development of the photo-voltaic cell as described in my Patent 1,941,494 there have been several factors which appear necessary if operation is desired in a circuit where there is no continuous current flow as when the cell is used in a capacitance-coupled circuit or in a highly negatively-biased grid circuit of a vacuum tube. As stated in the patent, in order to have the high speed response such as is required in sound film application where a frequency response of several thousand cycles is necessary, the electrolyte should be of an acidic character or should have a hydrogen ion content adequate for the photo-electrochemical effect which takes place at the junction of the oxide and the electrolyte.

In order to have maximum life it has been found that it is also of importance to have with the acidic electrolyte (such as a 0.2% acetic acid) an equal concentration of a haloid salt such as cobalt chloride. It has been found that the cobalt chloride when used with the weak acids, prevents the reduction of the oxide surface of the photo sensitive element which would otherwise take place. The exact quantities of acetic acid and cobalt chloride or the ratio of either one of these compounds to the solvent is dependent upon such factors as size of container, area of the oxide and area of the cooperating electrode surface.

Another improvement which not only increases the life of the cell, but allows it to operate at lower and higher temperatures is the use of a polyhedric alcohol as part of the electrolyte. Glycerine and ethylene glycol are examples of an alcohol of a desirable type. Apparently the viscous polyhedric alcohols are of the most utility.

Ethylene glycol is preferred and is mixed in to the extent of 30% of the distilled water which forms a solvent for the 0.2% acetic acid and 0.2% cobalt chloride in a given case.

While acetic acid is found to be a suitable compound, other acids, especially those having a low ionization constant, are of value as are salts which in solution form acidic reaction solutions, for instance, aluminum ammonium sulphate or aluminum sulphate. These solutions become acid by hydrolysis. Other salts of this type are sodium or potassium hydrogen sulphate, the hydrogen ion becoming effective upon hydrolysis in the water solvent.

These salts are of advantage because they have a very small effect upon the copper-cuprous oxide electrode, and yet supply the hydrogen ion necessary for dynamic response. When they are used it is of advantage to also add cobalt chloride which greatly prolongs the life of the cell. Among the other weak acids which may be used are lactic, citric, malic, etc. The inorganic acids if of such low concentration as not to seriously affect the oxides, may be used, especially if the case of the cell is chromium plated. An example of such an electrolyte is 0.01% of hydrochloric acid in distilled water and ethylene glycol in the percentages given.

The main problem in the selection of materials for this photo-cell is to have the electrolyte of sufficient hydrogen ion concentration for electrical considerations and yet insufficient hydrogen ion concentration for destructive chemical effect. By the combination of a salt hydrolyzable into a free hydrogen ion containing electrolyte and a metal haloid such as cobalt chloride in a solvent mixture of a polyhedric alcohol such as ethylene glycol and water, a long and efficient life is obtained. When a hydrolyzable salt such as aluminum sulphate or aluminum ammonium sulphate is used, the concentration is not as critical as with an acid such as acetic acid, where a concentration of about 0.25% gives maximum life. Whereas, if a suitable salt solution is used, the concentration can be in the order of one to two per cent.

It is observed that the frequency response of a cell varies with the source of the hydrogen ion. For example, when produced by hydrolysis of a salt a somewhat higher response obtains than from an acid such as acetic or hydrochloric.

In order to specifically describe a form of the invention, reference is made to the accompanying drawing (in which like numbers indicate like parts) in which the chromium plated copper shell (1) serves as the container and cathode. The pure resin type bakelite insulator (2) is forced into shell (1) and holds in place the photo-sensitive electrode which is composed of thermally-integrally-formed cuprous oxide layer (4) on copper base (3). The cuprous oxide surface is preferably etched to obtain maximum dynamic response. This etching may be accomplished either prior to the time the photo-sensitive electrode is inserted in the cell or by the action of the electrolyte in the cell after the cell has been assembled. The electrode itself may be made by heating the copper to a temperature of approximately 905° C. allowing it to cool slowly, and then cleaning. Screw (5) acts as the connection terminal for electrode (3)—(4). The face of the cell consists of thin glass lens (6) which is sealed around its edge with a waterproof sealing compound such as a heated shellac venice turpentine mixture (not shown). Threaded copper pin (7) serves as the terminal connection for the container and also serves as the plug for sealing in the electrolyte (8) after it has been poured in through the hole into which the plug is threaded. The electrolyte is composed of 0.2% aluminum ammonium sulphate and 0.2% cobalt chloride in a 30% ethylene glycol solution.

When the cell is operated connection is made to terminals (5) and (7) and under the influence of ordinary light a potential of 0.1 volt will be generated. The cell should be used in a capacitance circuit as described in my Patent 1,941,493. When used in such a circuit it will operate satisfactorily for several thousand hours.

Since certain changes in carrying out the construction of the cell and its components, and obvious substitutions can be made in the arrangement of the elements and in the materials without departing from the scope of the invention, it is intended that all matters contained in the above description or shown in the accompanying drawing shall be interpreted as illustrative and not in a limiting sense.

Having described my invention, what I claim as new and desire to secure by Letters Patent, is:

1. A photo-voltaic cell having a photo-sensitive electrode comprising a copper base having a thermally-integrally formed, crystalline cuprous oxide surface and an electrolyte comprising a polyhedric alcohol, a weak acid and a haloid and a cooperating electrode, the composition of said electrolyte and said cooperating electrode being such that an appreciable voltage is generated in said cell under the influence of light.

2. A photo-voltaic cell having a photo-sensitive electrode comprising a copper base having a thermally-integrally formed, crystalline cuprous oxide surface and an electrolyte comprising a viscous polyhedric alcohol, an acid and a haloid and a cooperating electrode, the composition of said electrolyte and said cooperating electrode being such that an appreciable voltage is generated in said cell under the influence of light.

3. A photo-voltaic cell having a photo-sensitive electrode comprising a copper base having a thermally-integrally formed, crystalline cuprous oxide surface and an electrolyte comprising a polyhedric alcohol, an acid and a salt, and a cooperating electrode, the composition of said electrolyte and said cooperating electrode being such that an appreciable voltage is generated in said cell under the influence of light.

4. A photo-voltaic cell having a photo-sensitive electrode comprising a copper base having a thermally-integrally formed, crystalline cuprous oxide surface and an electrolyte comprising a polyhedric alcohol and a haloid solution and a cooperating electrode, the composition of said electrolyte and said cooperating electrode being such that an appreciable voltage is generated in said cell under the influence of light.

5. A photo-voltaic cell having a photo-sensitive electrode comprising a copper base having a thermally-integrally formed, crystalline cuprous oxide surface and an electrolyte comprising a polyhedric alcohol and a chloride and a cooperating electrode, the composition of said electrolyte and said cooperating electrode being such that an appreciable voltage is generated in said cell under the influence of light.

6. A photo-voltaic cell having a photo-sensitive electrode comprising a copper base having a thermally-integrally formed, crystalline cuprous oxide surface and an electrolyte comprising a polyhedric alcohol and cobalt chloride and a cooperating electrode, the composition of said electrolyte and said cooperating electrode being such that an appreciable voltage is generated in said cell under the influence of light.

7. A photo-voltaic cell having a photo-sensitive electrode comprising a copper base having a thermally-integrally formed, crystalline cuprous oxide surface and an electrolyte comprising a polyhedric alcohol of the class comprising ethylene glycol and glycerine, a weak acid and cobalt chloride and a cooperating electrode, the composition of said electrolyte and said cooperating electrode being such that an appreciable voltage is generated in said cell under the influence of light.

8. A photo-voltaic cell having a photo-sensitive electrode comprising a copper base having a thermally-integrally formed, crystalline cuprous oxide surface and an electrolyte composed of the combination of a chloride and a salt which becomes acidic when hydrolyzed and a cooperating electrode, the composition of said electrolyte and said cooperating electrode being such that an appreciable voltage is generated in said cell under the influence of light.

9. A photo-voltaic cell having a photo-sensitive electrode comprising a copper base having a thermally-integrally formed, crystalline cuprous oxide surface and an electrolyte composed of cobalt chloride and a salt which becomes acidic when hydrolyzed and a cooperating electrode, the composition of said electrolyte and said cooperating electrode being such that an appreciable voltage is generated in said cell under the influence of light.

10. A photo-voltaic cell having a photo-sensitive electrode comprising a copper base having a thermally-integrally formed, crystalline cuprous oxide surface and an electrolyte composed of a polyhedric alcohol and a salt which becomes acidic when hydrolyzed and a cooperating electrode, the composition of said electrolyte and said cooperating electrode being such that an appreciable voltage is generated in said cell under the influence of light.

11. A photo-voltaic cell having a photo-sensitive electrode comprising a copper base having a thermally-integrally formed, crystalline cuprous oxide surface and an electrolyte composed of a polyhedric alcohol, a chloride and a salt which becomes acidic when hydrolyzed and a cooperating electrode, the composition of said electrolyte and said cooperating electrode being such that an appreciable voltage is generated in said cell under the influence of light.

12. A photo-voltaic cell having a photo-sensitive electrode comprising a copper base having a thermally-integrally formed, crystalline cuprous oxide surface and an electrolyte comprising a glycol and a hydrolyzable sulphate and a cooperating electrode, the composition of said electrolyte and said cooperating electrode being such that an appreciable voltage is generated in said cell under the influence of light.

13. A photo-voltaic cell having a photo-sensitive electrode comprising a copper base having a thermally-integrally formed, crystalline cuprous oxide surface and an electrolyte comprising acetic acid, cobalt chloride and ethylene glycol.

14. A photo-voltaic cell having a photo sensitive electrode comprising a copper base having a thermally-integrally formed, crystalline cuprous oxide surface and an electrolyte comprising acetic acid, cobalt chloride and glycerine.

15. A photo-voltaic cell having a container, a photo-sensitive electrode comprising a copper base having a thermally-integrally-formed, crystalline cuprous oxide surface, a cooperating electrode and an electrolyte comprising cobalt chloride and aluminum ammonium sulphate.

16. A photo-voltaic cell having a container, a photo-sensitive electrode comprising a copper base having a thermally-integrally-formed, crystalline cuprous oxide surface, a cooperating electrode and an electrolyte composed of a polyhedric alcohol of the glycol-glycerol type, cobalt chloride and aluminum ammonium sulphate.

17. A photo-voltaic cell having a photo-sensitive electrode comprising a copper base having a thermally-integrally-formed, crystalline cuprous oxide surface, a cooperating electrode and an electrolyte comprising aluminum ammonium sulphate.

18. A photo-voltaic cell having a photo-sensitive electrode comprising a copper base having a thermally-integrally-formed, crystalline cuprous oxide surface, a cooperating electrode and an electrolyte composed of a polyhedric alcohol and aluminum ammonium sulphate.

SAMUEL RUBEN.